United States Patent

Fasen et al.

[11] Patent Number: 6,124,996
[45] Date of Patent: Sep. 26, 2000

[54] SERVO SYSTEM AND METHOD WITH MULTIPLE PHASE CLOCK

[75] Inventors: Donald J. Fasen; Charles E. Hessing, both of Boise, Id.; Benjamin A. Willcocks, Bristol, United Kingdom

[73] Assignee: Hewlett-Packard Co., Palo Alto, Calif.

[21] Appl. No.: 09/175,908

[22] Filed: Oct. 20, 1998

[51] Int. Cl.⁷ .............................. G11B 5/09; G11B 5/584
[52] U.S. Cl. .......................................... 360/51; 360/77.12
[58] Field of Search ................................... 360/51, 77.01, 360/77.02, 77.12

[56] References Cited

U.S. PATENT DOCUMENTS

| | | | |
|---|---|---|---|
| 4,242,619 | 12/1980 | Nakamura et al. | 318/314 |
| 4,243,921 | 1/1981 | Tamura et al. | 318/314 |
| 4,668,900 | 5/1987 | Tabuchi | 318/608 |
| 5,065,081 | 11/1991 | Shah | 318/638 |
| 5,523,900 | 6/1996 | Kosugi et al. | 360/77.05 |
| 5,526,200 | 6/1996 | Yada | 360/51 |

FOREIGN PATENT DOCUMENTS

0690442A2  1/1996  European Pat. Off. .

*Primary Examiner*—W. Chris Kim

[57] ABSTRACT

A timing-based servo system for positioning a magnetic head relative to a magnetic storage medium, the magnetic storage medium having a servo pattern written thereon, the system comprising a head including a servo read element configured to read the servo pattern and produce a signal, the signal including recognizable signal events corresponding to the servo read element reading servo transitions; a servo decoder configured to receive the servo signal, determine the position of the head, with respect to the servo band, in response to the amount of time between the signal events, and generate an error signal indicative of actual head position relative to desired head position with respect to the servo band, the servo decoder including time capture logic configured to determine the amount of time between the signal events, the time capture logic including a multiple phase clock generator. A servo method for positioning a magnetic head relative to a magnetic storage medium, the magnetic storage medium having a servo pattern written thereon, the head including a servo read element configured to read the servo pattern and produce a signal, the signal including recognizable signal events corresponding to the servo read element reading servo transitions, the method comprising receiving the servo signal, and determining the position of the head, with respect to the servo band, by determining the amount of time between the signal events.

20 Claims, 6 Drawing Sheets

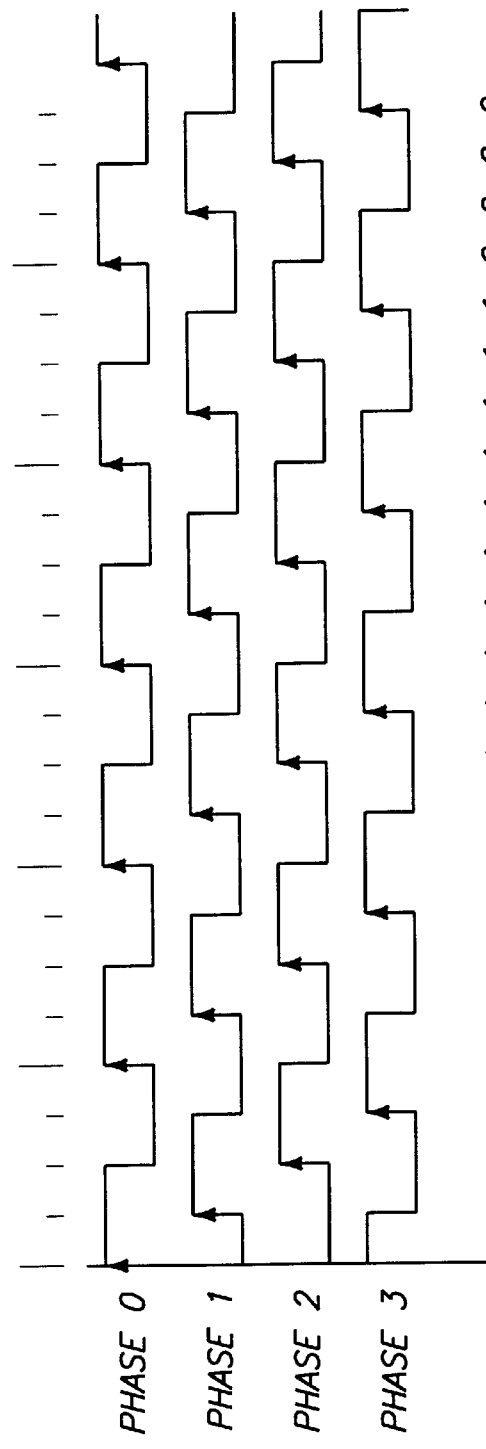
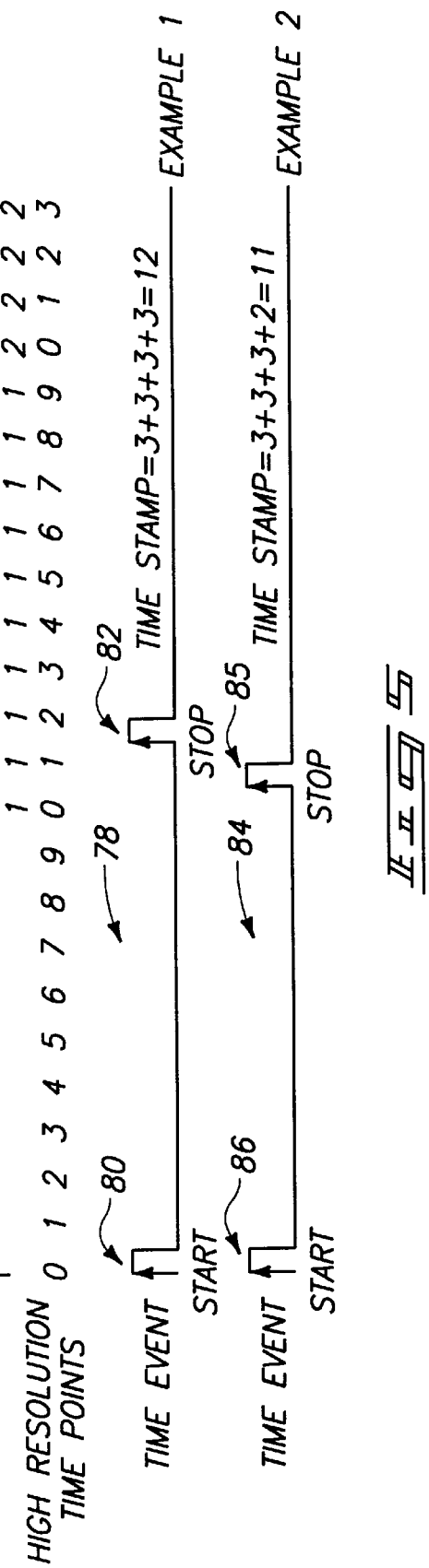
FIG. 5

SERVO SYSTEM AND METHOD WITH MULTIPLE PHASE CLOCK

FIELD OF THE INVENTION

The invention relates to servo systems. The invention also relates to reading servo data from magnetic media in a time based servo system.

BACKGROUND OF THE INVENTION

One method for storing information on magnetic tape uses what is a known as "helical scan" technology. Helical scan tape systems cause information to be recorded in stripes that are diagonal relative to the length of a tape. The helical scan systems use a rotating drum head operating on a slowly driven tape, for high capacity. The tape is wrapped around the rotating drum.

Another method for storing information on magnetic tape uses what is known as "linear recording" technology. Linear recording tape systems cause information to be recorded in multiple parallel tracks that extend in the direction of the length of the tape. Linear recording systems use a stationary head operating on tape that is driven past the head at a speed that is typically much faster than the speed used by helical scan tape systems. With linear recording systems, multiple read/write elements can be employed in a head and can simultaneously operate on the tape. This invention relates to linear recording drive systems.

Servo systems employ information or patterns recorded along a track of the tape to accurately position read/write elements relative to data on the tape. The servo information can be used to accurately position heads relative to the length of the tape (e.g., when searching for a desired position along the length of the tape, such as the start of a file) as well as relative to the width of the tape. Thus, servo patterns on a tape have a characteristic that changes across the width of the tape.

Various servo systems are known in the art. For example, U.S. Pat. No. 5,432,652 (incorporated herein by reference) relates to a magnetic tape that has three evenly spaced-apart longitudinally-extending servo track areas. Four equal-sized longitudinally-extending data track areas are disposed between the servo track areas and between longitudinal edges of the tape and one of said longitudinally-extending data track areas. For track following, all servo track areas are simultaneously sensed for producing one head positioning signal.

U.S. Pat. No. 5,008,765 (incorporated herein by reference) relates to a method for reading or writing data on a tape which has a plurality of data tracks and at least a first dedicated servo track. A multiple channel head is used to access the tracks on the tape. The head is moved proximate one of a plurality of predetermined positions. The channels are located so that, in any one predetermined position of the head, one channel accesses the center of a dedicated servo track on the tape and at least two other channels will access the center of distinct data tracks.

U.S. Pat. No. 5,262,908 (incorporated herein by reference) relates to a tracking control device for a magnetic recording/reproducing apparatus arranged in such a manner that a head unit having a plurality of magnetic heads is successively moved in the widthwise direction of a magnetic tape for switching tracking positions so that data recording/reproducing is, by each of the plurality of magnetic heads, performed along a plurality of data tracks formed on the magnetic tape in parallel to a direction in which the magnetic tape moves.

U.S. Pat. No. 5,574,602 (incorporated herein by reference) relates to a magnetic tape drive. A magnetic head simultaneously senses plural track lateral position indicators to generate a like plurality of independently generated sensed position error signals. The sensed position error signals are combined to provide an output position error signal that drives a positioning system to position the magnetic head laterally of the length of the magnetic tape. The output position error signal represents an average of the position errors indicated by the sensed position error signals. The quality of the sensed position error signal is monitored, eliminating poor quality signals from the output position error signal for maintaining a quality servo control.

U.S. Pat. No. 5,450,257 (incorporated herein by reference) relates to a head-track orienting system for use in magnetic recording tape drives which automatically corrects for misalignment between the head assembly and a recorded servo track on the tape. Using a servo control loop, the system calculates head-track alignment error during operation of the tape drive and either pivots the head assembly or adjusts the tape cartridge to compensate for the error. Transverse head-track positioning mechanisms are also included in the system to locate and maintain a centered position of the heads on the servo track.

One type of servo system is a timing based system. Timing based servo systems are known in the art. In such servo systems, servo bands are written which have a particular servo band configuration. This servo band configuration provides both an indication of position (and speed) in the direction of travel of the tape, and an indication of lateral position of the tape relative to the servo element reading the servo band. The tape drives include a timing based demodulation scheme for sensing the servo information on the tape. This information includes lateral position, tape speed, and encoded data bits. The position of the head relative to the tape width is derived from the relative timing of opposite azimuthally sloped transitions. Readback pulses from the servo code are processed in bursts. A burst is a set of transitions grouped together to generate a predetermined number of pulses when read. The time difference between adjacent bursts represents lateral position and the time difference between alternate bursts represents tape speed. See European Patent Application EP 0690442 A2 for detailed information regarding time based servo systems.

Demodulation of the time-based servo recorded on tapes requires the detection of the precise point in time the peaks of a servo readback waveform occur. The conventional method of recording the point in time an event occurs is to capture the count value of a counter driven by a high speed clock when the event occurs. Because of the high time resolution requirements of accurate position demodulation, the clock speed using this conventional method would need to be very high. For example, for typical tape speeds, a clock frequency of at least 400 MHZ should be used. This clock rate is beyond the capabilities of low cost, readily available ASIC technology.

SUMMARY OF THE INVENTION

The invention provides a timing based servo system which makes use of a multiple phase clock.

One aspect of the invention provides a timing-based servo system for positioning a magnetic head relative to a magnetic storage medium, the magnetic storage medium having a servo pattern written thereon in a servo band, the servo pattern including transitions, the magnetic medium being movable relative to the head, the system comprising a head including a servo read element configured to read the servo pattern and produce a signal, the signal including recognizable signal events corresponding to the servo read element reading servo transitions; a servo decoder configured to receive the servo signal, determine the position of the head, with respect to the servo band, in response to the amount of time between the signal events, and generate an error signal indicative of actual head position relative to desired head position with respect to the servo band, the servo decoder including time capture logic configured to determine the amount of time between the signal events, the time capture logic including a multiple phase clock generator; and a head positioner configured to adjust the position of the head relative to the magnetic storage medium, with respect to the servo band, in response to the error signal.

Another aspect of the invention provides a tape drive for use with a magnetic tape having a length and a width and a servo pattern written thereon, the servo pattern including transitions, the tape drive comprising a tape head including a servo read element configured to read the servo pattern and produce a signal, the signal including recognizable signal events corresponding to the servo read element reading servo transitions; a motor configured to move the length of the tape relative to the head such that the servo read element is able to read the servo pattern; a servo decoder configured to receive the servo signal, determine the position of the head, with respect to the servo band, in response to the amount of time between the signal events, and generate an error signal indicative of actual head position relative to desired head position with respect to the servo band, the servo decoder including time capture logic for determining the amount of time between the signal events, the time capture logic including a multiple phase clock generator having a plurality of delay elements cascaded together, the delay elements defining respective phases of the multiple phase clock generator, and the multiple phase clock generator having an input clock coupled to the input of the first of the cascaded delay elements; and a head positioner configured to adjust the position of the head relative to the tape, with respect to the servo band, in response to the error signal.

Another aspect of the invention provides a servo method for positioning a magnetic head relative to a magnetic storage medium, the magnetic storage medium having a servo pattern written thereon in a servo band, the servo pattern including transitions, the magnetic medium being movable relative to the head and the head being configured to read the servo pattern, the head including a servo read element configured to read the servo pattern and produce a signal, the signal including recognizable signal events corresponding to the servo read element reading servo transitions, the method comprising receiving the servo signal, and determining the position of the head, with respect to the servo band, by determining the amount of time between the signal events, wherein the determining of the amount of time between the signal events comprises using a multiple phase clock.

In one aspect of the invention, by using a clock with multiple phases of the same frequency with a uniform phase shift between each of the phases, a high resolution time capture of an event can be achieved with much lower clock speeds. For example, using a four phase clock at 50 MHZ would allow time capture resolution of 5 ns or the equivalent of a 200 MHZ single phase clock.

In one aspect of the invention, a servo system includes a multiple phase clock wherein a counter is provided for respective phases. Respective phases clock a counter which counts freely. When an event occurs (e.g., readback pulse peaks representing speed or position), the count values are latched in separate registers for each phase. After the latch data has settled, the sum of the values in each latch is computed to create a high resolution time value. The calculation of the sum is performed in a post processor while the counters continue to count. After the high resolution time stamps are calculated, further processing of the time difference between events (readback pulses) can be performed with conventional data path processing methods to calculate lateral position or tape speed.

There are other methods of combining the data from the multiple phases which can be employed which do not require the duplication of the counter for each of the clock phases. This is particularly beneficial as the number of phases increases.

In one embodiment, to implement a multiple phase clock generator, a plurality of delay elements are fed a fundamental frequency in cascade from an input clock and adjusted so that the phase of the output of the last delay element is the same as the input clock.

In one embodiment, the delay elements are adjustable and the phase error between the input clock and the output of the last delay element is filtered and used to adjust the delay of all delay elements. This way, the total delay of all delay elements is assured to be one cycle of the input clock over part to part, temperature, supply voltage and any other variations.

One aspect of the invention provides a tape drive in which tape speed is adapted to the data rate of a host computer which transfers data to the tape drive. This allows fast hosts to transfer data at a high rate while slow hosts will not be forcing the tape drive to stop the tape and reposition back as the data to be written to the tape runs out of a data buffer in the tape drive.

Other features and advantages of the invention will become apparent to those of ordinary skill in the art upon review of the following detailed description, claims, and drawings.

DESCRIPTION OF THE DRAWINGS

FIG. 5 is a graph illustrating operation of the circuitry of FIG. 4.

DETAILED DESCRIPTION OF THE INVENTION

Figure 1:
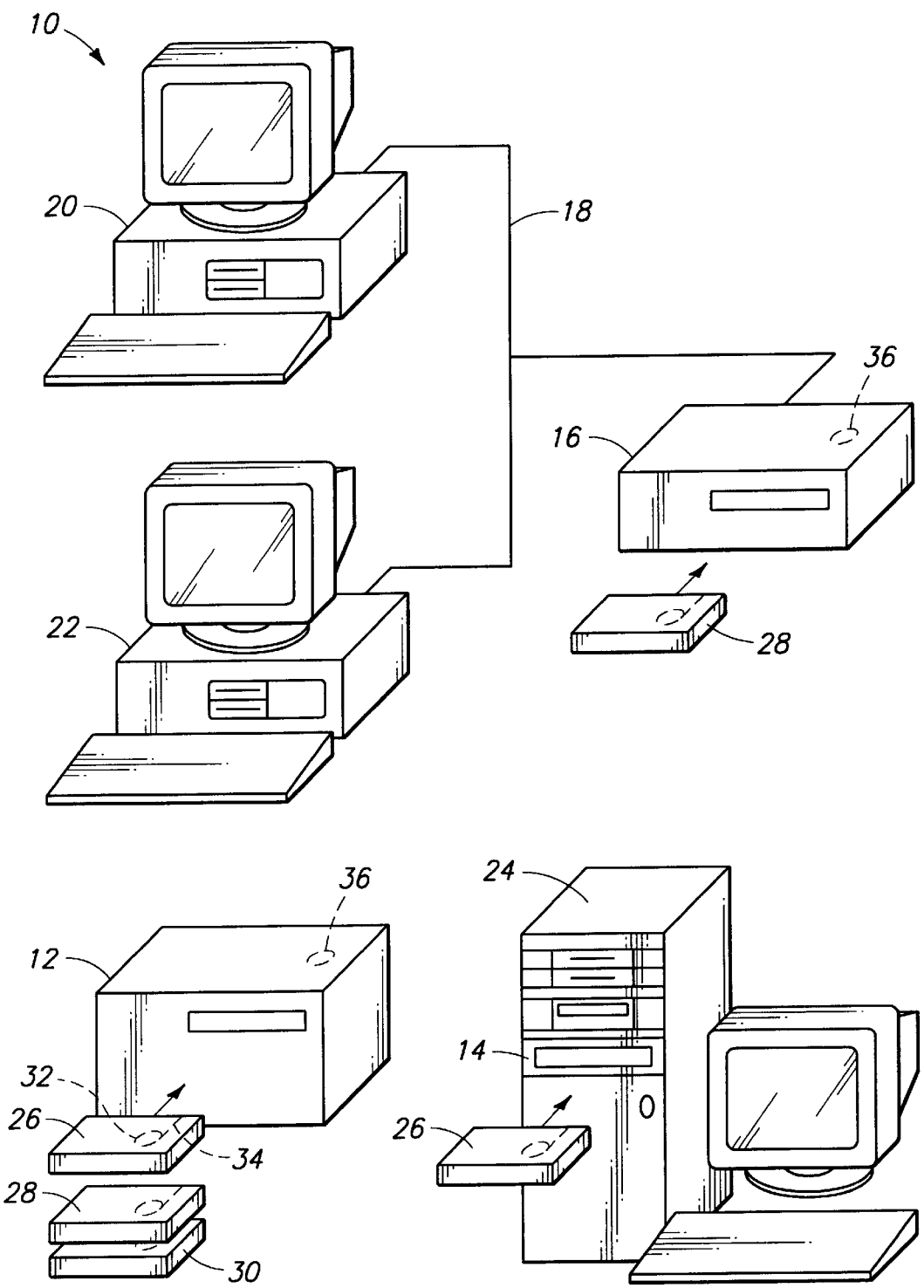
FIG. 1 is a perspective view of a system including a servo reader in accordance with one embodiment of the invention.

FIG. 1 shows a system 10 including a servo writer 12, and a plurality of drive units, such as tape drives 14 and 16. Although the invention is illustrated as being employed in connection with computer tape data storage in FIG. 1, the invention has a wide variety of applications. For example, some aspects of the invention can be used in connection with storage media other than tapes, or for storing either analog or digital music or information other than data. Some aspects of the invention can be embodied, for example, in connection with any of a variety of types of storage devices, including disk storage devices. For purposes of illustration only, the invention will be described in connection with tape technology.

The drive units 14 and 16 respectively read data from and write data to tape or other form of magnetic storage media. The tape drives 14 and 16 can be coupled to networks or used with individual computers. For example, tape drive 16 is connected to a network 18 for communication with computers 20 or 22, and tape drive 14 is used with an individual computer 24. Further, the tape drive coupled to a network or used with an individual computer can be either a stand alone unit (separate from a computer) or can be configured to be received in a bay in a computer. For example, in the illustrated embodiment, tape drive 16 is a stand alone tape drive, and tape drive 14 is supported in a bay inside a housing of computer 24. In the illustrated embodiment, the drive units 14 and 16 are linear recording drive systems. Alternative embodiments are possible.

In the illustrated embodiment, the servo writer 12 and the tape drives 14 and 16 are used with tape cartridges 26, 28, or 30. In the illustrated embodiment, the tape cartridges are single reel type tape cartridges, and respectively include a housing supporting a reel 32, and tape 34 wound on the reel. A second reel 36 included in the servo unit 12 or in the tape drive 14 or 16 engages the tape. In an alternative embodiment, the tape cartridge includes two reels. The tape has a width W (FIG. 2) such as 8 mm, 4 mm, ¼ inch, or ½ inch. The tape also has a length in the direction of tape travel (i.e., in the direction perpendicular to the direction of the width W). The direction of tape travel is illustrated by an arrow 37.

The servo writer 12 pre-writes servo code to the tapes for subsequent use in a tape drive 14 or 16 which reads and writes data and reads servo code. The servo writer 12 produces timing based servo patterns, as opposed to amplitude based servo patterns.

Figure 2:
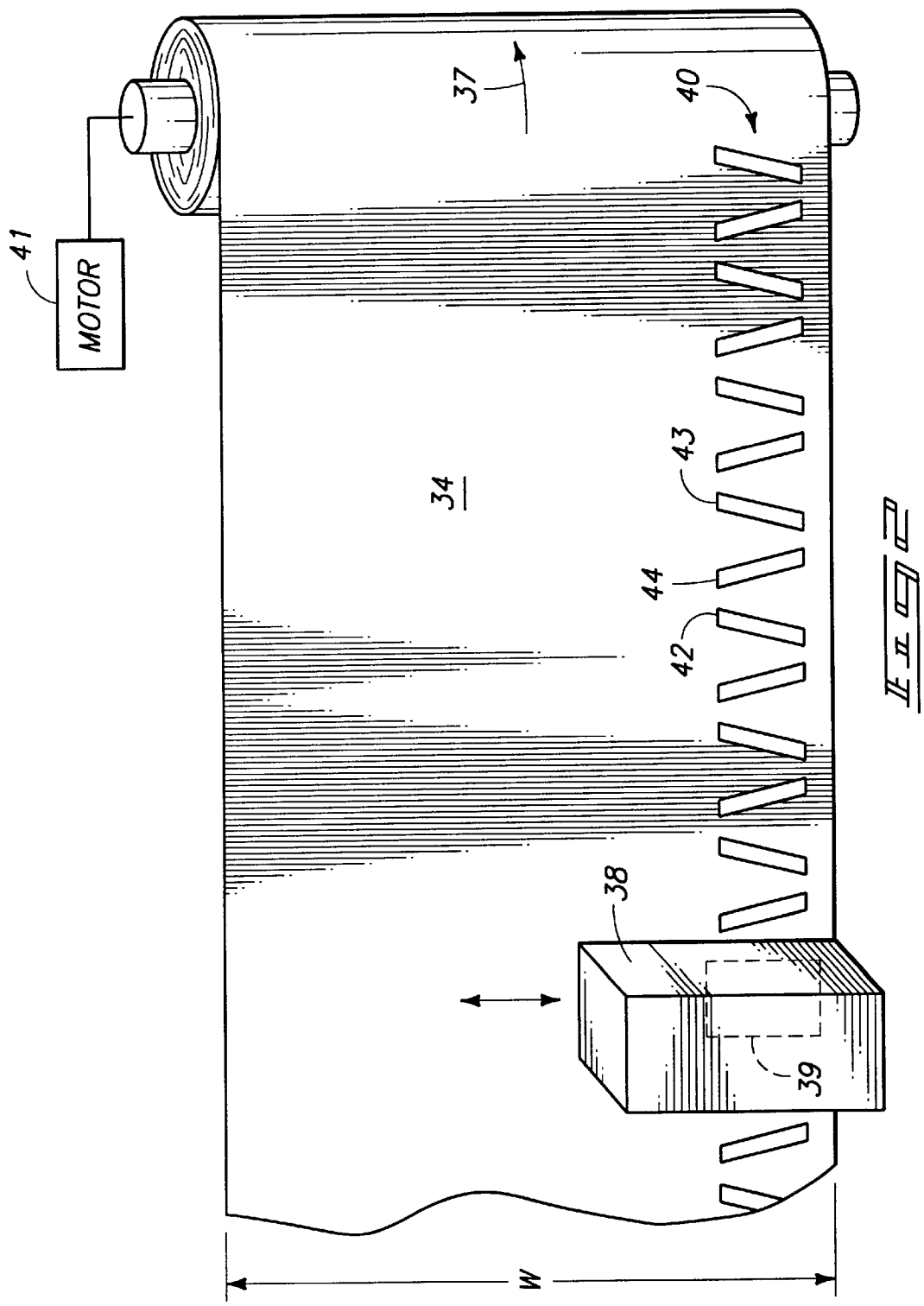
FIG. 2 illustrates a servo pattern in a servo band read by the servo reader of FIG. 1.

FIG. 2 illustrates a servo band configuration that could be employed in one embodiment of the invention for a servo band. This servo band configuration shown in FIG. 2 provides both an indication of position (and speed) in the direction of travel of the tape, and an indication of lateral position of the tape relative to the servo element reading the servo band. The tape drives 14 and 16 include a timing based demodulation scheme for sensing the servo information on the tape 34. The tapes drives 14 and 16 have respective heads 38. The position of a head 38 relative to the tape width W is derived from the relative timing of azimuthally sloped transitions. More particularly, the heads 38 respectively include servo read elements 39, and the tape 34 has written thereon servo code in a servo band 40. The servo code includes two opposite azimuth bursts with a count of ten transitions and two opposite azimuth bursts with a count of eight transitions. As show in FIG. 2, there are transitions, such as transitions 42 and 43 with a positive slope, and transitions such as transition 44 with a negative slope. Regardless of the lateral position of the head 38, the timing between transitions 42 and 43 is the same because transitions 42 and 43 have the same slope. Therefore, speed information is easily determined. In order to determine lateral position of the head 38, in order to determine whether the head is closer to one side or the other of the servo band, a pattern of two bursts of ten transitions followed by two bursts of eight transitions is used. In the illustrated embodiment, by way of example, the transitions 42 and 43 are written at six degrees azimuth angle. Thus, readback pulses from the servo code are processed in bursts. A burst is a set of transitions grouped together to generate a predetermined number of pulses when read. The time difference between adjacent bursts represents lateral position and the time difference between alternate bursts represents tape speed. See European Patent Application EP 0690442 A2 for detailed information regarding time based servo systems.

Because this is a time based servo system, a high resolution timing measurement is necessary to achieve a high resolution position measurement.

The tape 34 is movable relative to the head 38. More particularly, the tape drives 14 and 16 respectively include a motor 41 configured to move the length of the tape relative to the head and the servo read element 39 of the head 38 reads the servo pattern. The servo read element 39 produces a signal including recognizable signal events corresponding to the servo read element reading servo transitions. More particularly, a peak occurs in the servo readback waveform when the servo read element 39 reads a servo transition 42, 43, or 44.

Figure 3:
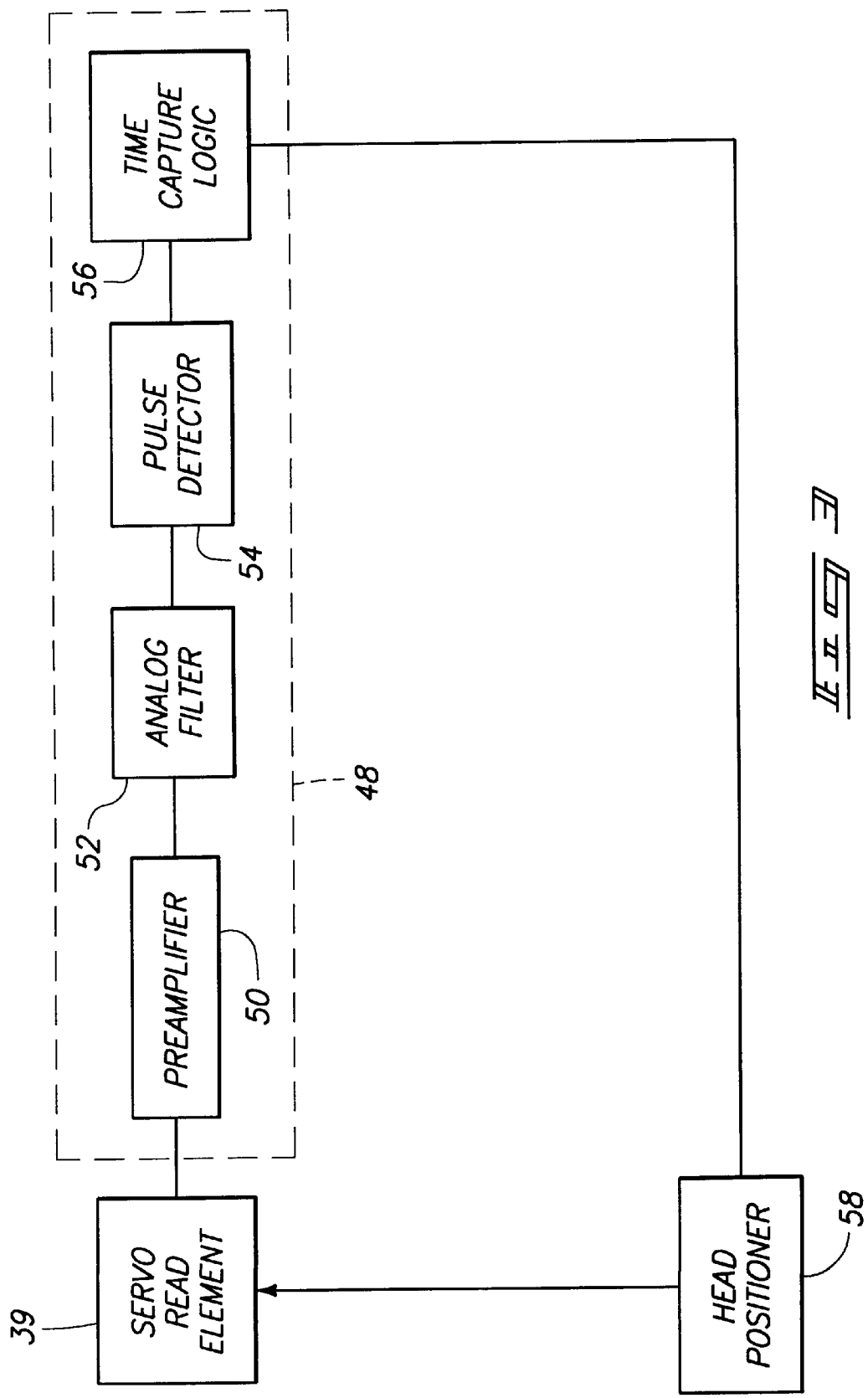
FIG. 3 is a block diagram illustrating circuitry included in the servo reader of FIG. 1.

The tape drives 14 and 16 respectively include a servo decoder 48 (FIG. 3) configured to receive the servo signal from the servo read element 39. In the illustrated embodiment, the servo decoder 48 is defined in an application specific integrated circuit (ASIC) which includes a preamplifier 50 coupled to the servo read element 39, a noise removing analog filter 52 coupled to the preamplifier 50, a pulse detector 54 coupled to the analog filter 52, and time capture logic 56 coupled to the pulse detector 54.

The servo decoder 48 determines the position of the head 38, with respect to the servo band 40, in response to the amount of time between the signal events, and generates an error signal indicative of actual head position relative to desired head position in the servo band 40. For example, in a linear drive system, the error signal indicates actual head position relative to desired head position with respect to the width W of the tape 34.

The tape drives 14 and 16 respectively further include a head positioner 58 configured to adjust the position the head relative to the magnetic storage medium, with respect to the servo band 40, in response to the error signal.

Figure 4:
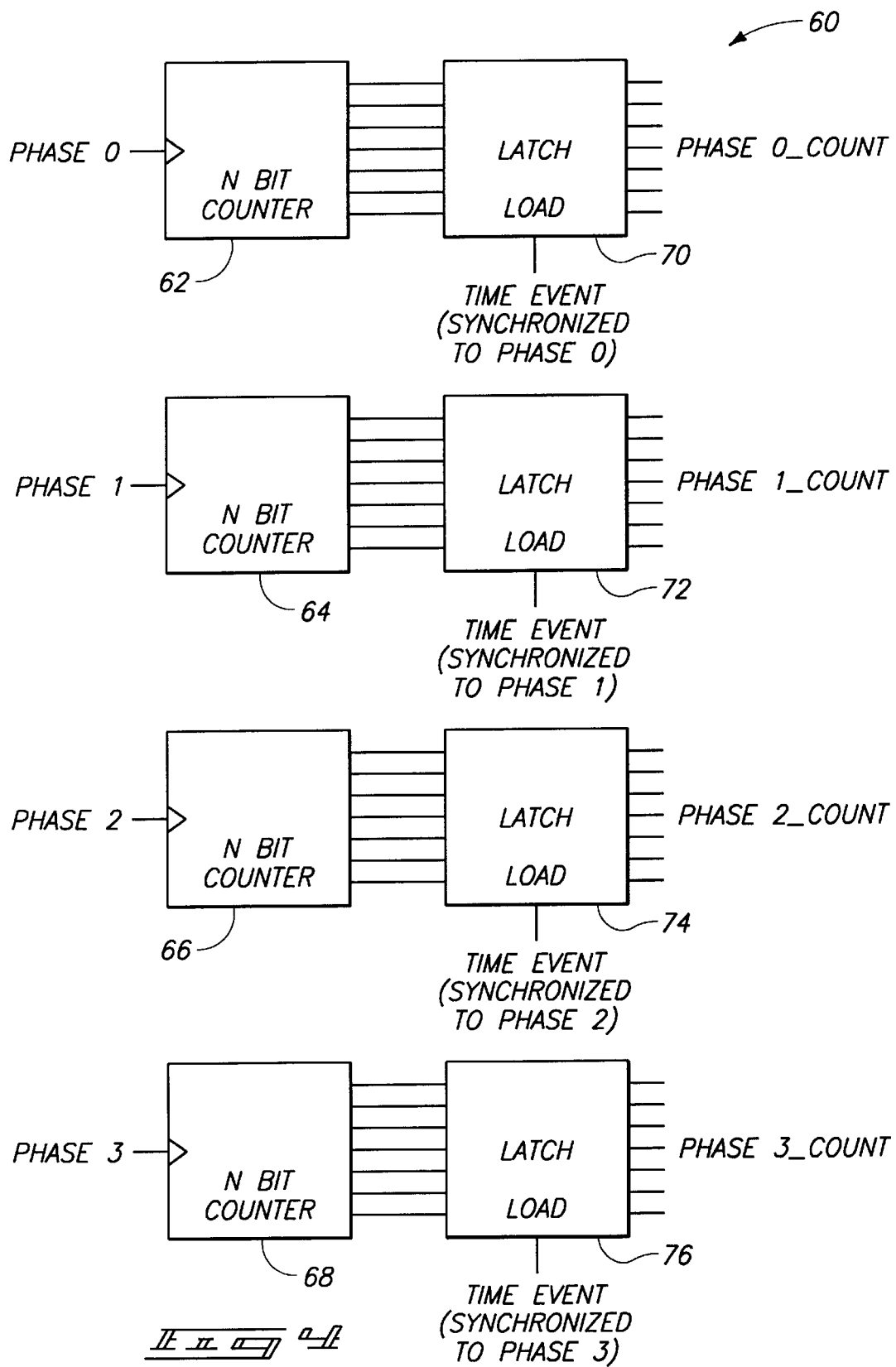
FIG. 4 illustrates counter circuitry included in the servo reader of FIG. 1.

The time capture logic 56 of the servo decoder 48 is configured to determine the amount of time between the signal events, as indicated by the pulse detector 54. The time capture logic includes time capture circuitry 60 (FIG. 4).

In one embodiment, the time capture circuitry 60 comprises a plurality of counters 62, 64, 66, and 68. The counters 62, 64, 66, and 68 are multiple-bit binary counters configured to count freely. The time capture circuitry 60 further includes a plurality of multiple-bit latches 70, 72, 74, and 76 respectively coupled to the binary counters. The latches latch count values for the respective phases in response to the recognizable signal events corresponding to the servo read element reading servo transitions. The latches include load inputs which are triggered by the leading edge of a pulse indicating a time event is starting or stopping. To minimize asynchronous circuitry, multiple instances of the time events are created, corresponding to the number of phases, and each latch 70, 72, 74, and 76 is synchronized to one of the instances. After the latch data has settled, the sum of the values in the latches 70, 72, 74, and 76 is computed to create a high resolution time value. The calculation of the sum is performed in a post processor in the time capture logic 56 while the counters 62, 64, 66, and 68 continue to count. After the high resolution time stamps are calculated, further processing of the time difference between events is performed with conventional data path processing methods.

FIG. 5 illustrates the increase in resolution that is gained by having multiple phases. For a first time event 78, the time stamp is equal to the sum of count values for counters 62, 64, 66, and 68 between leading edges of start and stop pulses 80 and 82. There are three leading edges for each phase 0 through phase 3 between the leading edges of pulses 80 and 82. Thus, the time stamp for the event 78 is 3+3+3+3=12.

For a second time event 84, the time stamp is equal to the sum of count values for counters 62, 64, 66, and 68 between leading edges of start and stop pulses 86 and 85. There are three leading edges for each phase 0 through phase 2 between the leading edges of pulses 86 and 85 and two leading edges for phase 3. Thus, the time stamp for the event 78 is 3+3+3+2=11. If a multiple phase clock was not used, it would not be possible to distinguish between time events 78 and 84 using a clock of the same speed.

In one embodiment, the counters are respectively configured to count at a frequency no greater than 400 MHZ. More particularly, the number of phases for the multiple phase clock are selected based on a desired resolution and based on the frequency of the input clock. For example, using a four phase clock at 50 MHZ allows time capture resolution of 5 ns (1÷50 MHZ÷4) or the equivalent of a 200 MHZ single phase clock. Thus, in one embodiment, the counters are respectively configured to count at a frequency no greater than 50 MHZ and the multiple phase clock includes at least four phases. As higher and higher speed clocks become possible and cost effective in ASICs, as technology progresses, the invention will still provide increased resolution for any given clock speed.

There are other methods of combining the data from the multiple phases which do not require the duplication of the counter for each of the clock phases. This is especially beneficial as the number of phases increases.

Figure 6:
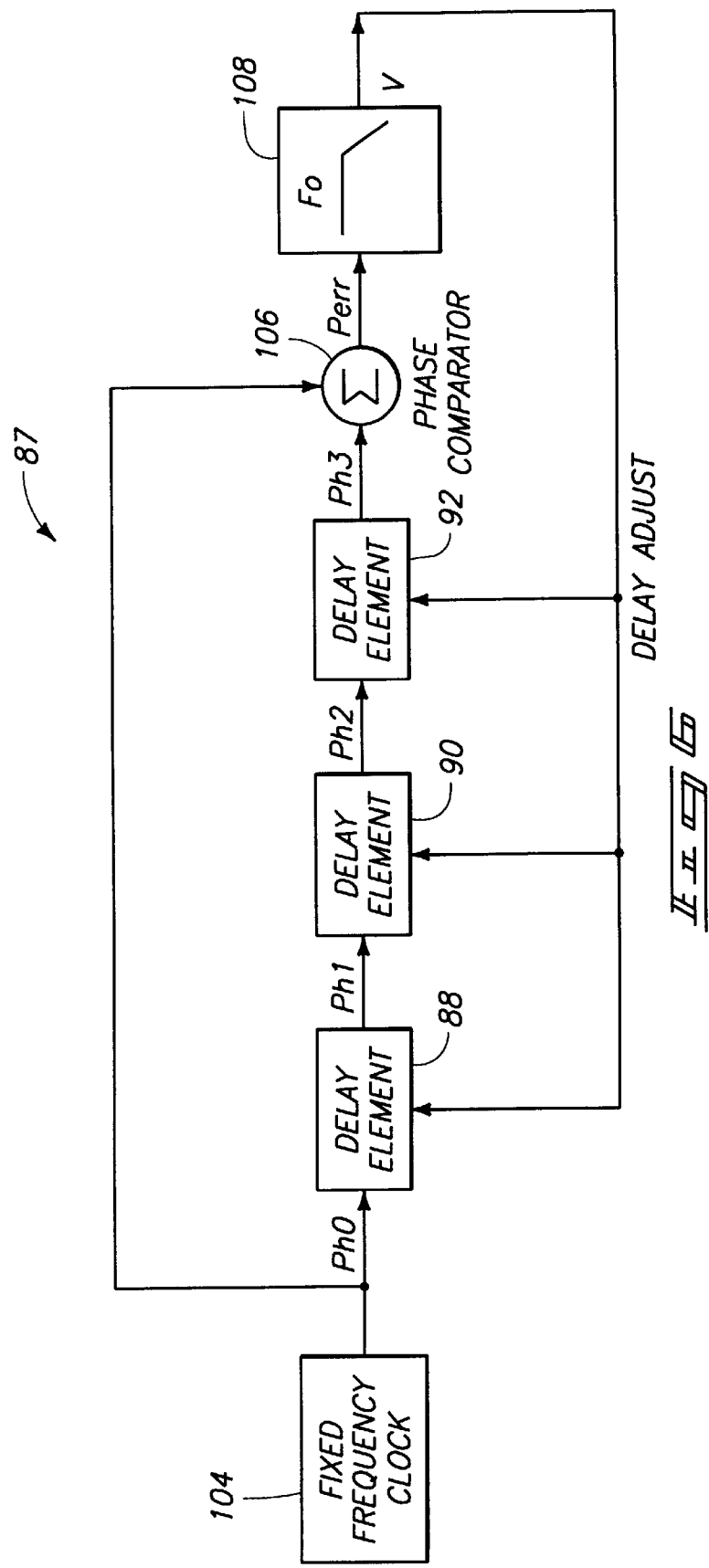
FIG. 6 illustrates a multiple phase clock generator.

An example of an implementation of a multiple phase clock generator 87 (FIG. 6) will now be provided. The multiple phase clock generator 87 provides clock signals for clocking counters 62, 64, 66, and 68 of FIG. 4. In one embodiment, a multiple phase clock generator 87 comprises a plurality of delay elements 88, 90, and 92 coupled together in cascade, and an input clock 104 coupled to the first delay element 88. The delay elements 88, 90, and 92 each have an input and an output. The delay elements define respective phases Ph0, Ph1, Ph2, and Ph3 of the multiple phase clock generator 87. These phases Ph0, Ph1, Ph2, and Ph3 are coupled to the clock inputs PHASE 0, PHASE 1, PHASE 2, and PHASE 3, respectively, of counters 62, 64, 66, and 68 of FIG. 4. Thus, the number of delay elements 88, 90, and 92 depends on the number of phases. In the illustrated embodiment, three delay elements are provided defining four phases Ph0, Ph1, Ph2, and Ph3. However, there may be any desired number of phases. For example, in one embodiment, there are eight phases. The multiple phase clock generator 87 further includes an input clock 104 coupled to the input of the first delay element 88. The last delay element 92 has an output Ph3 that is controlled to have a phase that is the same as the phase of the input clock 104. More particularly, the delay elements 88, 90, and 92 are adjustable delay elements and the tape drives 14 and 16 further include control circuitry configured to adjust the delay elements such that the output Ph3 of the last delay element 92 has the same phase as the input clock 104. In the illustrated embodiment, the delay elements 88, 90, and 92 are all controlled simultaneously as opposed to being individually controllable. The delay elements 88, 90, and 92 are therefore preferably constructed in a localized and controlled manner, so that the delay variation between delay elements is limited. Otherwise, non-uniformity of the phases with respect to each other phase may lead to error in the captured time value of the event.

The control circuitry includes a phase comparator 106 which compares the phase of the output Ph3 of the last delay element 92 with the input clock 104 and provides an output Perr indicative of any difference in phase. The control circuitry further comprises a low pass filter 108. The phase error between the input clock 104 and the output Ph3 of the last delay element 92 is filtered and used to adjust the delay of all of the delay elements 88, 90, and 92. This way, the total delay of all of the delay elements is assured to be one cycle of the input clock over part to part, temperature, supply voltage and any other variations.

The number of phases of the multiple phase clock generator 87 is selected based on a desired resolution and based on the frequency of the input clock 104. For example, in one embodiment, the input clock 104 has a frequency no greater than 50 MHZ and wherein the multiple phase clock generator has at least four phases. Using a four phase clock at 50 MHZ allows time capture resolution of 5 ns or the equivalent of a 200 MHZ single phase clock. In another embodiment, the input clock 104 has a frequency no greater than 50 MHZ and wherein the multiple phase clock generator has at least eight phases.

Thus, by using multiple clock phases of the same frequency with a uniform phase shift between each of the phases, a high resolution time capture of an event can be achieved with much lower clock speeds. This results in higher positioning accuracy in a time based servo system.

The protection sought is not to be limited to the disclosed embodiments, which are given by way of example only, but instead is to be limited only by the scope of the appended claims.

What is claimed is:

1. A timing-based servo system for positioning a magnetic head relative to a magnetic storage medium, the magnetic storage medium having a servo pattern written thereon in a servo band, the servo pattern including transitions, the magnetic medium being movable relative to the head, the system comprising:
   a head including a servo read element configured to read the servo pattern and produce a signal, the signal including recognizable signal events corresponding to the servo read element reading servo transitions;
   a servo decoder configured to receive the servo signal, determine the position of the head, with respect to the servo band, in response to the amount of time between the signal events, and generate an error signal indicative of actual head position relative to desired head position with respect to the servo band, the servo decoder including time capture logic configured to determine the amount of time between the signal events, the time capture logic including a multiple phase clock generator, generating multiple clock phases of the same frequency with a uniform phase shift between each of the phases; and
   a head positioner configured to adjust the position of the head relative to the magnetic storage medium, with respect to the servo band, in response to the error signal.

2. A timing-based servo system for positioning a magnetic head relative to a magnetic storage medium in accordance with claim 1 wherein the time capture logic comprises a plurality of counters.

3. A timing-based servo system for positioning a magnetic head relative to a magnetic storage medium in accordance with claim 1 wherein the time capture logic comprises a plurality of multiple-bit binary counters configured to count freely, and a plurality of multiple-bit latches respectively coupled to the binary counters, wherein the latches latch count values for the respective phases in response to the recognizable signal events corresponding to the servo read element reading servo transitions.

4. A timing-based servo system for positioning a magnetic head relative to a magnetic storage medium in accordance with claim 3 wherein the counters are respectively configured to count at a first predetermined frequency and wherein the multiple phase clock generator includes at least two phases.

5. A timing-based servo system for positioning a magnetic head relative to a magnetic storage medium in accordance with claim 1 wherein the multiple phase clock generator includes a number of phases selected based on a desired resolution.

6. A timing-based servo system for positioning a magnetic head relative to a magnetic storage medium in accordance with claim 2 wherein the counters are respectively configured to count at a first predetermined frequency and wherein the multiple phase clock generator includes at least four phases.

7. A timing-based servo system for positioning a magnetic head relative to a magnetic storage medium in accordance with claim 1 wherein the multiple phase clock generator includes a plurality of delay elements coupled together in cascade, and an input clock coupled to the cascaded delay elements.

8. A timing-based servo system for positioning a magnetic head relative to a magnetic storage medium in accordance with claim 7 wherein the multiple phase clock generator has a plurality of phases and wherein the number of delay elements depends on the number of phases.

9. A timing-based servo system for positioning a magnetic head relative to a magnetic storage medium in accordance with claim 7 wherein the multiple phase clock generator includes a plurality of delay elements coupled together in cascade and respectively having an input and an output, and an input clock coupled to the input of the first of the cascaded delay elements, and wherein the last of the cascaded delay elements has an output with a phase that is the same as the phase of the input clock.

10. A tape drive for use with a magnetic tape having a length and a width and a servo pattern written thereon, the servo pattern including transitions, the tape drive comprising:
   a tape head including a servo read element configured to read the servo pattern and produce a signal, the signal including recognizable signal events corresponding to the servo read element reading servo transitions;
   a motor configured to move the length of the tape relative to the head such that the servo read element is able to read the servo pattern;
   a servo decoder configured to receive the servo signal, determine the position of the head, with respect to the servo band, in response to the amount of time between the signal events, and generate an error signal indicative of actual head position relative to desired head position with respect to the servo band, the servo decoder including time capture logic for determining the amount of time between the signal events, the time capture logic including a multiple phase clock generator having a plurality of delay elements cascaded together, the delay elements defining respective phases of the multiple phase clock generator, the clock phases having the same frequency with a uniform phase shift between each of the phases, and the multiple phase clock generator having an input clock coupled to the input of the first of the cascaded delay elements; and
   a head positioner configured to adjust the position of the head relative to the tape, with respect to the servo band, in response to the error signal.

11. A tape drive in accordance with claim 10 wherein the delay elements are adjustable delay elements and wherein the tape drive further includes control circuitry configured to adjust the delay elements such that the output of the last delay element has the same phase as the input clock.

12. A tape drive in accordance with claim 11 wherein the control circuitry comprises a low pass filter.

13. A tape drive in accordance with claim 10 wherein the last of the cascaded delay elements has an output with a phase that is the same as the phase of the input clock.

14. A tape drive in accordance with claim 10 wherein the input clock has a predetermined frequency and wherein the multiple phase clock generator has at least two phases.

15. A tape drive in accordance with claim 10 wherein the number of phases of the multiple phase clock generator is selected based on a desired resolution and based on the frequency of the input clock.

16. A tape drive in accordance with claim 10 wherein the input clock has a predetermined frequency and wherein the multiple phase clock generator has at least four phases.

17. A tape drive in accordance with claim 10 wherein the input clock has a predetermined frequency and wherein the multiple phase clock generator has at least eight phases.

18. A servo method for positioning a magnetic head relative to a magnetic storage medium, the magnetic storage medium having a servo pattern written thereon in a servo band, the servo pattern including transitions, the magnetic medium being movable relative to the head and the head being configured to read the servo pattern, the head including a servo read element configured to read the servo pattern and produce a signal, the signal including recognizable signal events corresponding to the servo read element reading servo transitions, the method comprising:
   receiving the servo signal, and determining the position of the head, with respect to the servo band, by determining the amount of time between the signal events, wherein the determining of the amount of time between the signal events comprises using a multiple phase clock, the clock phases having the same frequency with a uniform phase shift between each of the phases.

19. A servo method in accordance with claim 18 wherein using a multiple phase clock comprises using counters for respective phases, and latches coupled to the respective counters for latching count values between the signal events.

20. A servo method in accordance with claim 18 wherein using a multiple phase clock comprises generating multiple phase clock signals using cascaded delay elements, respective delay elements defining respective phases.

* * * * *